(12) United States Patent
Jeong et al.

(10) Patent No.: US 8,597,857 B2
(45) Date of Patent: Dec. 3, 2013

(54) METALLIC POROUS BODY FOR FUEL CELL

(75) Inventors: Byeong-Heon Jeong, Gyeonggi-do (KR); Bo Ki Hong, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/110,497

(22) Filed: May 18, 2011

(65) Prior Publication Data
US 2012/0115072 A1     May 10, 2012

(30) Foreign Application Priority Data
Nov. 5, 2010 (KR) .................. 10-2010-0109472

(51) Int. Cl.
*H01M 8/04* (2006.01)

(52) U.S. Cl.
USPC .......................................... 429/534; 429/480

(58) Field of Classification Search
USPC ......... 429/465, 480, 514, 485, 534, 474, 479, 429/491
See application file for complete search history.

(56) References Cited

U.S. PATENT DOCUMENTS

| | | | |
|---|---|---|---|
| 6,794,075 B2 * | 9/2004 | Steele et al. | 429/465 |
| 2007/0281187 A1 * | 12/2007 | Faita et al. | 429/13 |
| 2011/0171558 A1 * | 7/2011 | Mogi | 429/465 |

FOREIGN PATENT DOCUMENTS

| | | |
|---|---|---|
| JP | 2010-108852 A | 5/2010 |
| KR | 10-2003-0007825 A | 1/2003 |
| KR | 10-0719201 | 6/2003 |
| KR | 10-0830272 | 2/2004 |
| KR | 10-0786368 | 12/2007 |
| KR | 10-0805458 | 2/2008 |

* cited by examiner

*Primary Examiner* — Mark F Huff
*Assistant Examiner* — Monique Wills
(74) *Attorney, Agent, or Firm* — Edwards Wildman Palmer LLP; Peter F. Corless

(57) ABSTRACT

The present invention provides a metallic porous body for a fuel cell, which includes a flat portion formed to be integrated with a gasket or a separator and a gasket, and thus the metallic porous body has improved handling and working properties and can be accurately and precisely stacked, thus improving the stability of cell performance, the air-tightness, and the productivity of a fuel cell stack. As such, the present invention provides a metallic porous body for a fuel cell including a porous portion, which is in contact with a reactive area of a membrane electrode assembly and corresponds to a reactive area of each unit cell, and a flat portion having a flat surface structure formed along outer edges of the metallic porous body other than the porous portion corresponding to the reactive area.

11 Claims, 11 Drawing Sheets

(a)

(b)

(a)

(b)

(a)

(b)

METALLIC POROUS BODY FOR FUEL CELL

CROSS-REFERENCE TO RELATED APPLICATION

This application claims under 35 U.S.C. §119(a) the benefit of Korean Patent Application No. 10-2010-0109472 filed Nov. 5, 2010, the entire contents of which are incorporated herein by reference.

BACKGROUND (a) Technical Field

The present invention relates to a metallic porous body for a fuel cell. More particularly, the present invention relates to a metallic porous body for a fuel cell, which has improved handling and working properties and can be accurately and precisely stacked, thereby improving the productivity of a fuel cell stack as well.

(b) Background Art

A fuel cell is an electrical generation system that does not convert the chemical energy of fuel into heat by combustion, but rather electrochemically converts the chemical energy directly into electrical energy in a fuel cell stack. Fuel cells can be used as an electric power supply for small-sized electrical and electronic devices, including, for example, portable devices, industrial uses, household appliances and vehicles.

One of the most widely used fuel cells for vehicles, in particular, is a proton exchange membrane fuel cell or a polymer electrolyte membrane fuel cell (PEMFC), which made up of a fuel cell stack having a membrane electrode assembly (MEA), a gas diffusion layer (GDL), a gasket, a sealing member, and a bipolar plate (separator). Generally, the MEA includes a polymer electrolyte membrane, through which hydrogen ions are transported and an electrode/catalyst layer, in which an electrochemical reaction takes place, is disposed on each of both sides of the polymer electrolyte membrane. The GDL functions to uniformly diffuse reactant gases and transmit generated electricity. The gasket functions to provide the appropriate air-tightness to reactant gases and coolant. The sealing member functions to provide an appropriate bonding pressure. Finally, the bipolar plate functions to support the MEA and GDL, collect and transmit generated electricity, transmit reactant gases, transmit and remove reaction products, and transmit coolant to remove reaction heat, etc.

The GDL is bonded to the outer surface of the electrode/catalyst layer, which is coated on the surface of the polymer electrolyte membrane to form an anode ("fuel electrode) and a cathode ("air electrode" or "oxygen electrode") and functions to supply hydrogen and air (oxygen) as reactant gases, transfer electrons generated by the electrochemical reaction, and discharge reaction product water to minimize flooding in the fuel cell.

Recently, there has been extensive research around the world focused on the application of a thin metal plate having a mesh structure instead of carbon fiber, to the GDL of the fuel cell, i.e., a porous structure such as an expanded metal, a metal mesh, etc.

FIG. 1 shows metallic porous bodies which can be used as the GDL of the fuel cell, in which (a) shows an example of an expanded metal porous body and (b) shows an example of a metal mesh porous body. The expanded metal 1 shown in (a) of FIG. 1 is an example of a porous plate having a plurality of rectangular apertures formed by pressing or rolling a metal plate, and the metal mesh 2 shown in (b) of FIG. 1 is an example of a porous plate formed by weaving a plurality of wires 2a in a mesh shape.

These metallic porous bodies having regular porous structures can exhibit uniform performance during use in the fuel cell and reduce the deviation between the cells. Moreover, the diffusion of reactant gases is improved and the discharge of water is efficient, thus contributing to the improvement of fuel cells overall performance.

However, even in the case where these metallic porous bodies 1 and 2 are used as the GDLs, each of the metallic porous bodies 1 and 2 are stacked together with fuel cell components such as the MEA, separator, gasket, etc. in the same manner as conventional methods, thus completing the fuel cell stack.

Conventionally, the metallic porous bodies 1 and 2 shown in FIG. 1 are cut into a size suitable for a reactive area on the separator of the fuel cell (i.e., a reactive area of the membrane electrode assembly), simply placed on the separator, and then assembled with the separator. Here, each of the metallic porous bodies 1 and 2 are a separate component, which are not integrated with any other fuel cell components.

These metallic porous bodies have sharp outer edges formed during cutting due to the nature of the material and, when the conventional metallic porous bodies are used without any modification, the handling and working properties are deteriorated due to the sharp outer edges formed during cell assembly.

In particular, the sharp outer edges of the metallic porous bodies are more likely to damage pin apertures of the membrane electrode assembly, which are in contact with the sharp outer edges during cell assembly, thus deteriorating the overall performance of the fuel cell stack.

Moreover, since the conventional metallic porous bodies are separate components, which are not integrated with any other fuel cell components, the arrangement of the metallic porous bodies becomes irregular during cell assembly, and thus the metallic porous bodies cannot be accurately and precisely stacked. Further, an automatic assembly (stacking) method such as air suction cannot be employed, which reduces the productivity of the fuel cell stack. In an automatic assembly (stacking) method such as air suction, metallic porous bodies must be transported in a state where they are adsorbed on the suction device. However, due to the presence of many pores on the surface (i.e., lack of flat surface) of the metallic porous bodies, it is difficult to have a stable adsorption between the metallic porous bodies and the suction device. Therefore, to obtain a stable adsorption it is essential that the suction device adsorb to a non-porous flat surface.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a metallic porous body for a fuel cell, which has improved handling and working properties. Moreover, the present invention provides a metallic porous body for a fuel cell, which can be accurately and precisely stacked and can be processed by an automatic assembly method, thus improving the productivity of a fuel cell stack.

In one aspect, the present invention provides a metallic porous body for a fuel cell formed by stacking a plurality of unit cells made of a metallic porous body. This metallic porous body has a porous portion which is in contact with a reactive area of a membrane electrode assembly and corresponds to a reactive area of each unit cell; and a flat portion which has a flat surface structure formed along outer edges of the metallic porous body other than the porous portion corresponding to the reactive area.

In some embodiments of the present invention, the flat portion may be integrated with a gasket formed by injection molding so that the gasket may be integrally bonded to the metallic porous body.

In another embodiment, the flat portion located on both sides of the metallic porous body has manifold apertures, through which hydrogen, air, and coolant pass, having the same size as manifold apertures of a separator and formed at locations corresponding to the manifold apertures of the separator. In particular, the manifold apertures of the flat portion form hydrogen, air, and coolant inlet and outlet manifolds together with the manifold apertures of the separator after the fuel cell has been assembled.

In still another embodiment, the manifold apertures of the flat portion may be integrated with a gasket formed by injection molding such that the metallic porous body may be integrally bonded to the gasket around the manifold apertures of the flat portion.

In yet another embodiment, the gasket may be molded and bonded to both sides of the flat portion of the metallic porous body or molded to surround the outer edges and both sides of the flat portion.

In still yet another embodiment, the gasket may be molded to surround the flat portion and the outer edges of the separator, in a state where the metallic porous body and the separator are stacked together, such that the separator may be further integrated with the metallic porous body due to the gasket.

In a further embodiment, the gasket may be molded and bonded to the manifold apertures of the separator to provide a state where the metallic porous body and the separator are integrated together.

In another further embodiment, the flat portion provides through apertures, formed at positions where the gasket is molded, such that the metallic porous body may be firmly integrated with the gasket molded on both sides of the flat portion by a resin to act as the gasket inserted into the through apertures.

In some embodiments of the present invention, the separator also has through apertures formed at positions corresponding to the through apertures in the flat portion. In this embodiment, the gasket may be molded to surround the outer edges of the flat portion and the separator (including their corresponding through apertures). By doing so, the metallic porous body and the separator may be stacked together, so that the metallic porous body may be firmly integrated with the gasket and the separator via the through apertures.

In yet another further embodiment, the porous portion corresponding to the reactive area may be an expanded metal or a metal mesh. When the porous portion corresponding to the reactive area is the expanded metal, preferably only the porous portion has apertures. Furthermore, in this embodiment of the present invention, a metal plate, having no apertures, is disposed at the outer edges of the porous portion to constitute the flat portion integrated with the porous portion.

However, when the porous portion corresponding to the reactive area is the metal mesh, the outer edges of the metal mesh may be coated with a thin metal film or inserted into internal grooves of an opening of a metal member having a rectangular frame shape so that the metal film or metal member constitutes the flat portion and the metal mesh constitutes the porous portion.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
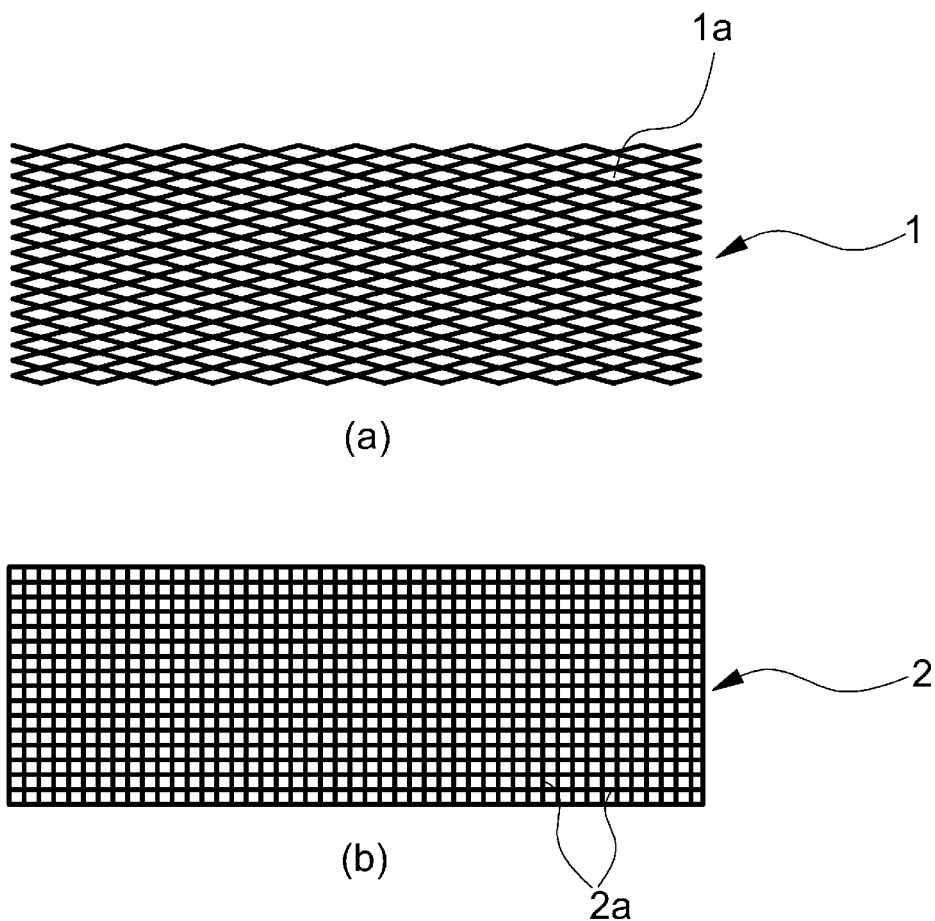
FIG. 1 shows conventional metallic porous bodies which can be used as fuel cell components, in which (a) shows an example of an expanded metal porous body and (b) shows an example of a metal mesh porous body.

Reference numerals set forth in the Drawings includes reference to the following elements as further discussed below:

| 10: metallic porous body | 11: porous portion (reactive area) |
|---|---|
| 12: flat portion | 14: through aperture |
| 20: gasket | 30: separator |
| 31: through aperture | 40: membrane electrode assembly |

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a metallic porous body for a fuel cell, which can be used as a gas diffusion layer (GDL) component in the fuel cell. More specifically, the metallic porous body of the present invention has a flat portion which includes a flat surface structure formed along the outer edges of the metallic porous body.

Figure 2:
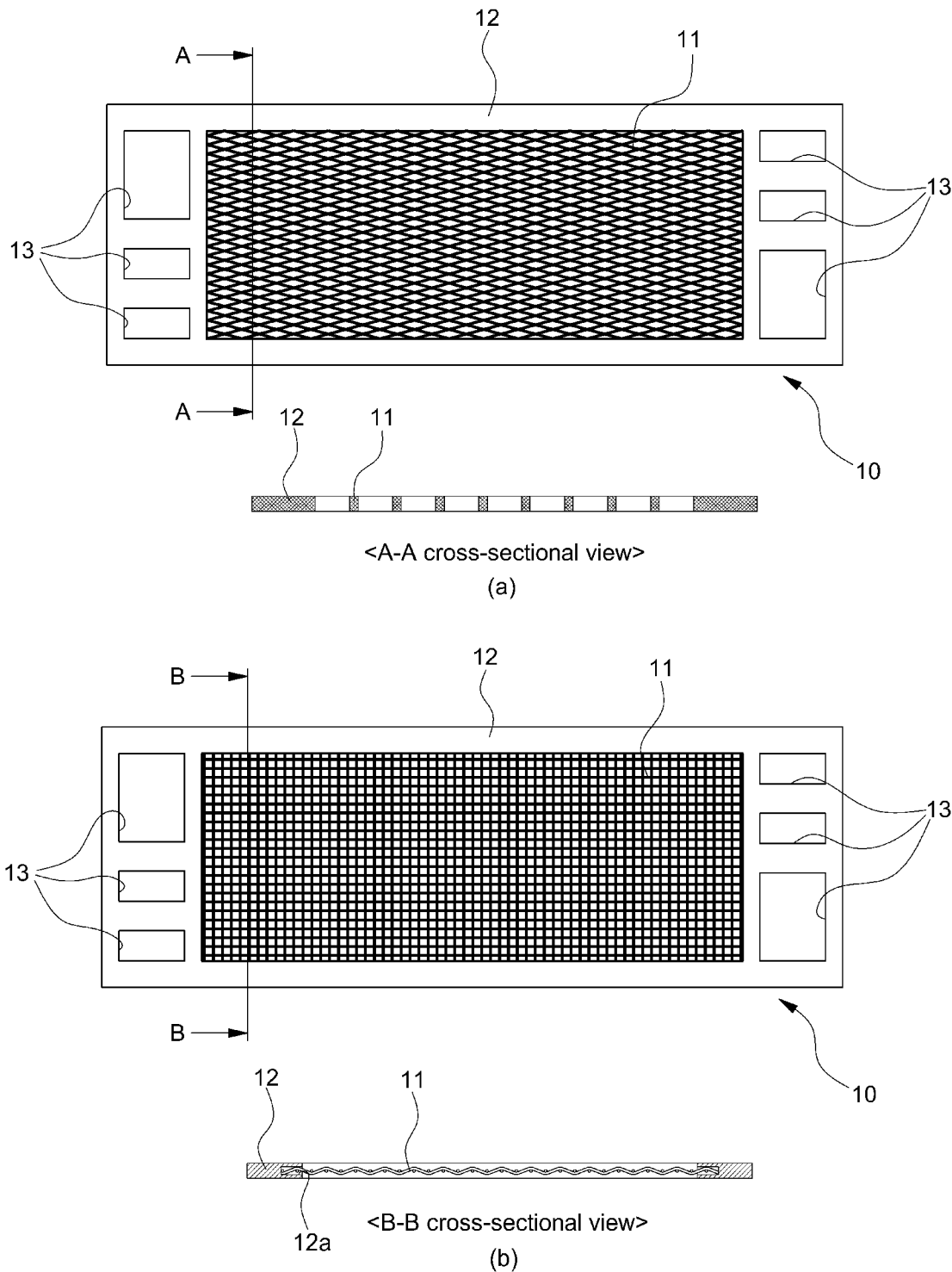
FIG. 2 shows plan views of metallic porous bodies each having a flat portion in accordance with an exemplary embodiment of the present invention.

FIG. 2 shows plan views of metallic porous bodies each having a flat portion in accordance with the present invention, in which (a) shows a metallic porous body using an expanded metal and (b) shows a metallic porous body using a metal mesh. FIG. 2 also shows cross-sectional views taken along lines A-A and B-B, respectively.

As shown in FIG. 2, each of metallic porous bodies 10 in accordance with the present invention comprises a porous portion 11 formed in an area corresponding to a reactive area on a fuel cell separator (e.g., a reactive area bonded to a catalyst layer of a membrane electrode assembly) and a flat portion 12 having a flat surface structure formed along the outer edges of the metallic porous body other than the porous portion 11.

Here, when expanded metal is prepared by forming a plurality of apertures in a raw material, as shown in (a) of FIG. 2, the flat portion 12 may be prepared without forming an aperture on the outer edges. For example, a plurality of rectangular apertures are formed by pressing or rolling a metal plate to have a porous structure in an area other than predetermined outer edges corresponding to the flat portion 12.

That is, the metal plate is designed so that the outer edges have no apertures and correspond to the flat portion 12, and the interior has apertures corresponds to the porous portion 11 which further corresponds to the reactive area of the porous body.

Alternatively, the metal mesh porous plate or body is formed by weaving a plurality of wires. In this embodiment, a member for forming the flat portion 12 may be separately provided, considering that the flat portion cannot be integrally formed on the outer edges like the expanded metal porous body plate.

That is, a metal member 12 with a rectangular frame shape, may be provided into which a metal mesh 11 can be inserted, as shown in (b) of FIG. 2. Mechanically, the outer edges of the metal mesh 11 (i.e., porous portion) may be inserted into internal grooves of a rectangular opening of the metal member 12 (i.e., flat portion) as shown in the B-B cross-sectional view of FIG. 2 so that the metal mesh 11 is located in the rectangular opening of the metal member 12, thus integrally forming a metal mesh porous body 10 with the flat portion 12 formed on the outer edges.

In this case, the metal member 12 corresponds to the flat portion and the metal mesh 11 corresponds to the porous portion.

Alternatively, the flat portion 12 may also be formed by applying a metal film along the outer edges of the metal mesh 11.

In one embodiment, the metallic porous body 10 may be substantially the same size as the overall size of the separator to be assembled with the separator and the membrane electrode assembly during cell assembly. Additionally, manifold apertures 13, through which hydrogen, air, and coolant pass, may be formed in the flat portion 12 at both ends of the metallic porous body 10.

The manifold apertures 13 maybe the same sizes as corresponding manifold apertures of the separator, through which hydrogen, air, and coolant pass, and are formed at positions corresponding to those of the separator respectively. Therefore, after the fuel cell assembly, the manifold apertures 13 at both ends of the metallic porous body 10 and the manifold apertures of the separator constitute an inlet manifold and an outlet manifold of the fuel cell stack, through which hydrogen, air, and coolant are supplied to and discharged from each unit cell (e.g., through each flow field of the separator).

Since the metallic porous body 10 formed in the above manner has a flat portion 12 along the outer edges, a gasket can be integrally formed on the flat portion 12, and thus a gasket-integrated metallic porous body may be formed.

Figure 3:
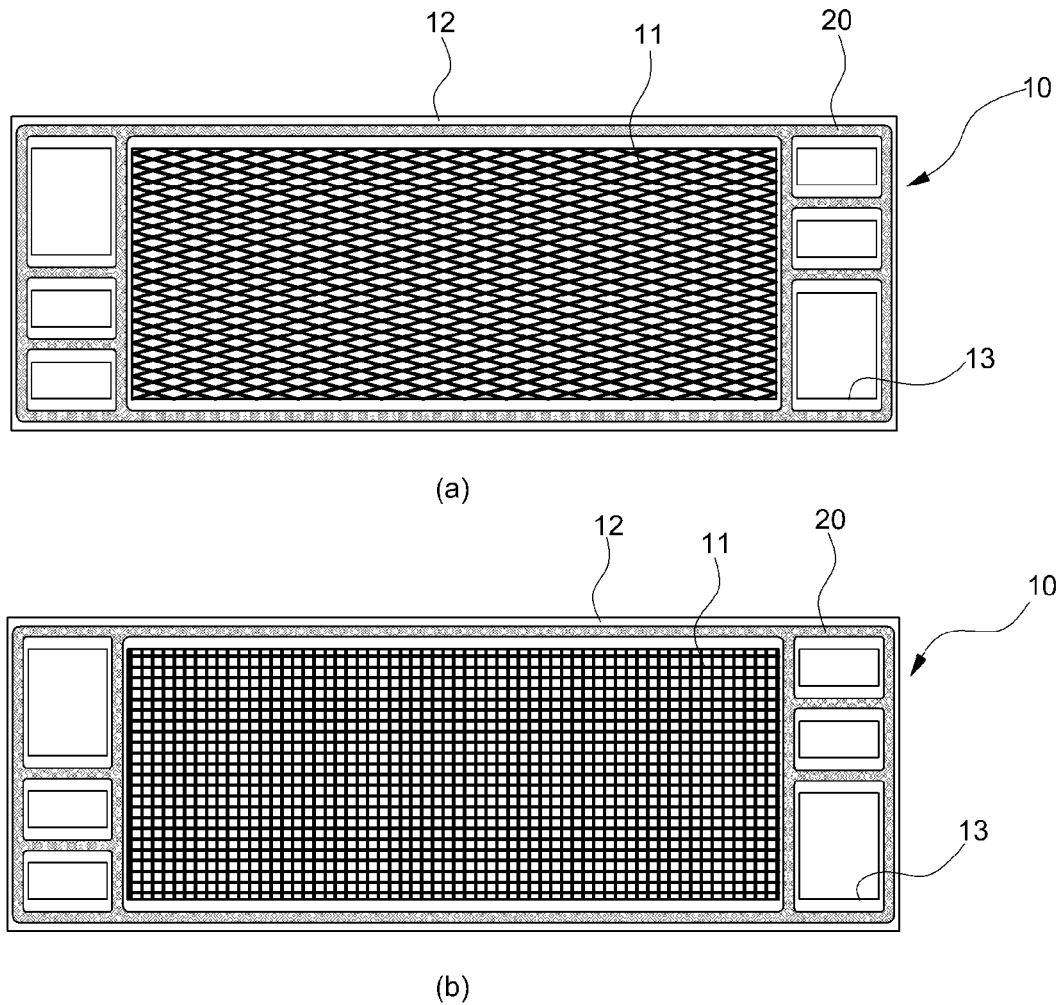
FIG. 3 shows plan views of gasket-integrated metallic porous bodies in accordance with an exemplary embodiment of the present invention.

FIG. 3 shows plan views of gasket-integrated metallic porous bodies in accordance with an exemplary embodiment of the present invention, in which (a) shows a gasket-integrated metallic porous body 10 using an expended metal and (b) shows a gasket-integrated metallic porous body 10 using a metal mesh.

The gasket-integrated metallic porous body 10 may be formed by fixing the metallic porous body 10 (in which the flat portion and the porous portion are integrally formed) shown in FIG. 2 in an injection mold and injection molding a resin to act as the gasket 20 on the surface of the flat portion 12. As such, when the gasket 20 is integrally formed on the flat portion 12 of the metallic porous body 10 by injection molding, the gasket 20 may be bonded to both sides of the flat portion 12 of the metallic porous body 10.

Referring to FIG. 3, it can be seen that the gasket 20 is integrally bonded to the metallic porous body 10 along the entire perimeter of the porous portion 11 and the manifold apertures 13 respectively by injection molding.

Thus, according to the present invention, by utilizing a flat portion 12 formed along the outer edges of the metallic porous body 10 as shown in FIG. 3, it is possible to form a gasket-integrated metallic porous body 10 by injection molding the gasket 20 on the flat portion 12.

As a result, when the gasket-integrated metallic porous body 10 according to the present invention is used, an increase the productivity may be found if the fuel cell stack is assembled by stacking a plurality of unit cells.

Moreover, while the conventional metallic porous bodies have sharp outer edges, the metallic porous body 10 according to the present invention has the flat portion 12 formed along the outer edges, and thus the handling and working properties can be improved during cell assembly. Moreover, it is possible to minimize the risk of damaging the membrane electrode assembly, thus improving the uniformity of cell performance and its safety overall.

Figure 4:
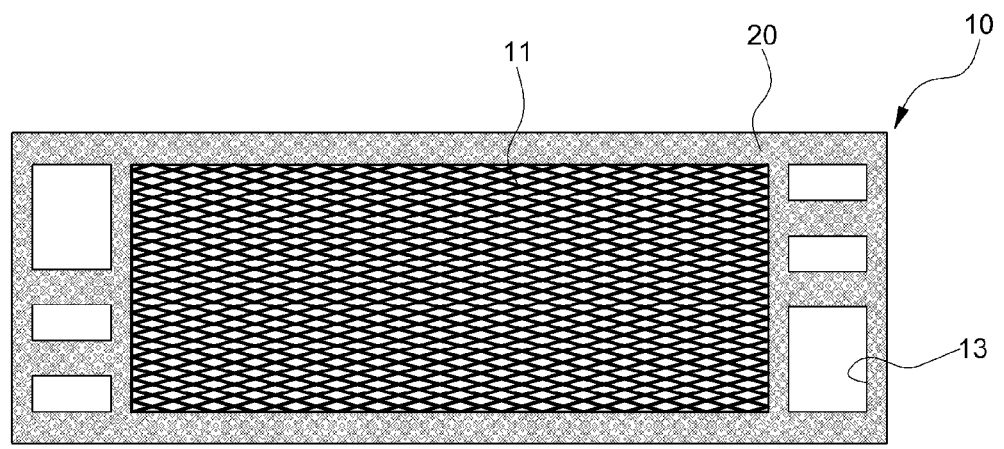
FIG. 4 shows plan views of gasket-integrated metallic porous bodies in accordance with another exemplary embodiment of the present invention.
Figure 4:
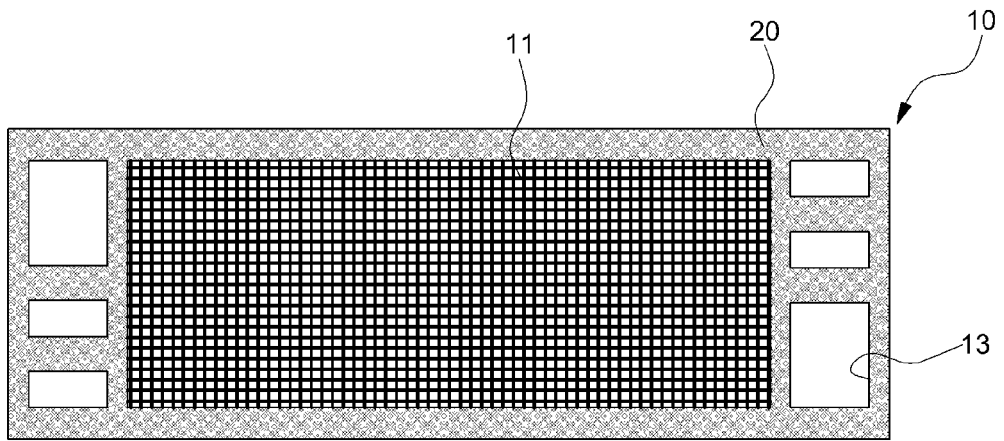

FIG. 4 shows plan views of gasket-integrated metallic porous bodies in accordance with another exemplary embodiment of the present invention, in which (a) shows a gasket-integrated metallic porous body 10 using an expended metal and (b) shows a gasket-integrated metallic porous body 10 using a metal mesh.

In the embodiment of FIG. 4, the entire perimeter of a flat portion (denoted by reference numeral 12 in FIG. 2) other than a porous portion 11 and manifold apertures 13 is integrally surrounded by a gasket 20.

As shown in the figure, the gasket 20 may be, e.g., injection molded to surround the flat portion on both sides of the metallic porous body 10. In detail, the gasket-integrated metallic porous body, in which the flat portion around the porous portion 11 and the manifold apertures 13 is integrated with the gasket 20, can be formed by, for example, injecting a resin to act as the gasket 20 on the flat portion around the porous portion 11 and the manifold apertures 13.

When the gasket-integrated metallic porous body 10, in which the gasket 20 is bonded to the flat portion, is used, a stack assembling apparatus using an automatic stacking method such as air suction may be advantageously used, thereby improving efficiency of the assembly process.

Figure 5:
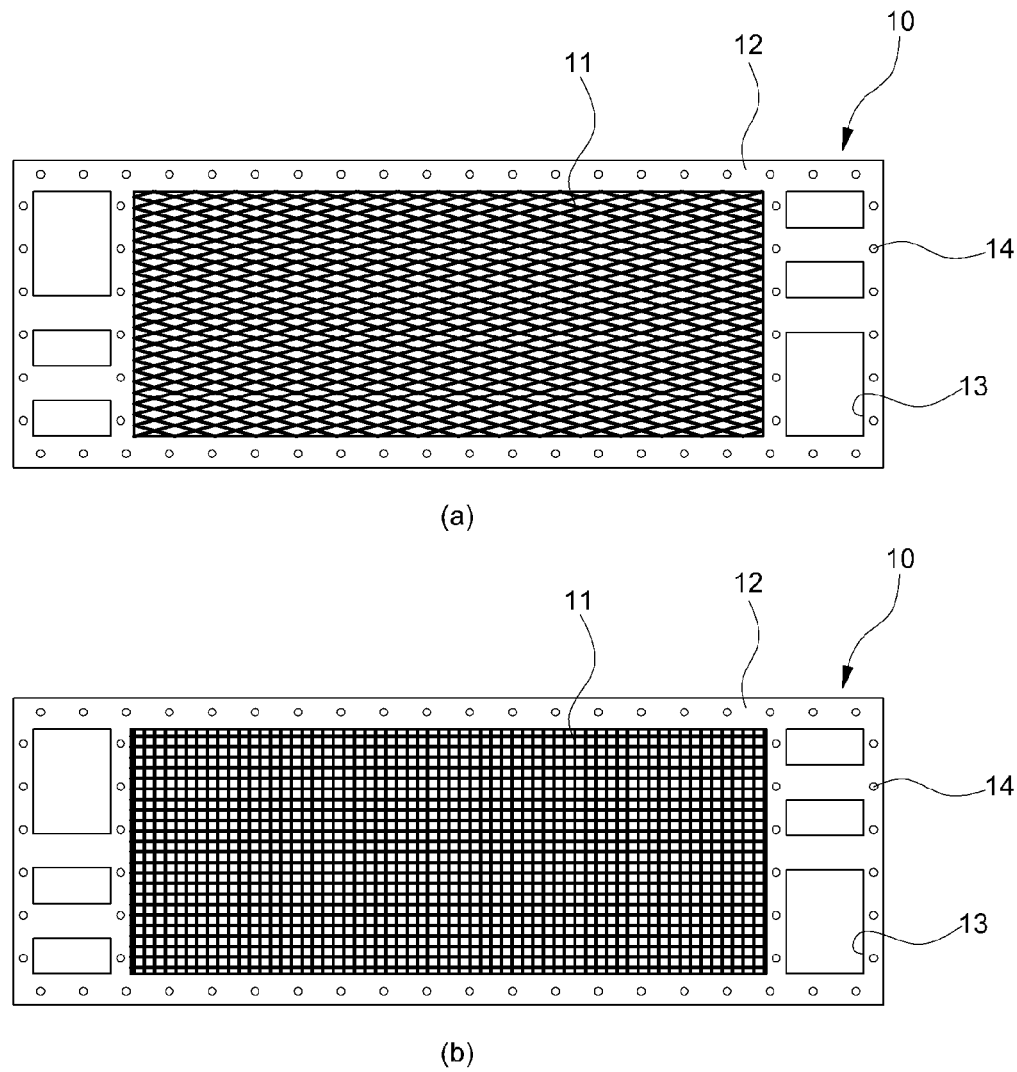
FIGS. 5 and 6 show plan views of metallic porous bodies with improved integration with a gasket in accordance with the exemplary embodiment of the present invention.
Figure 6:
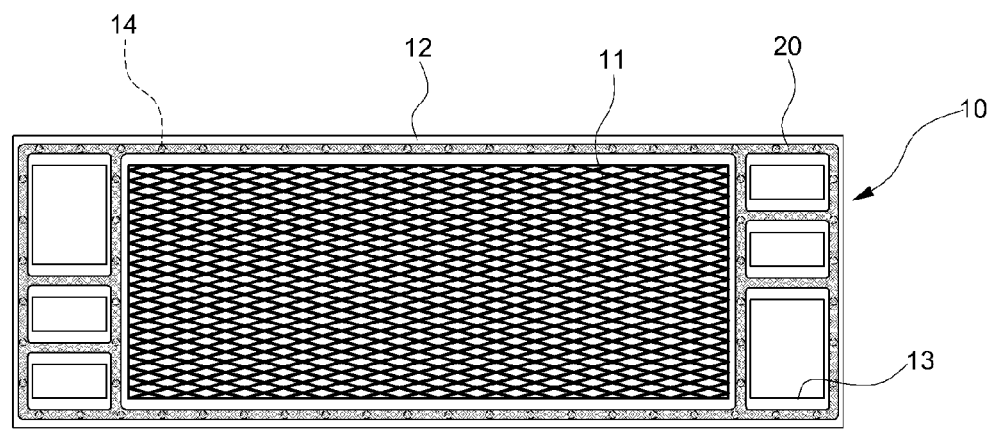
Figure 6:
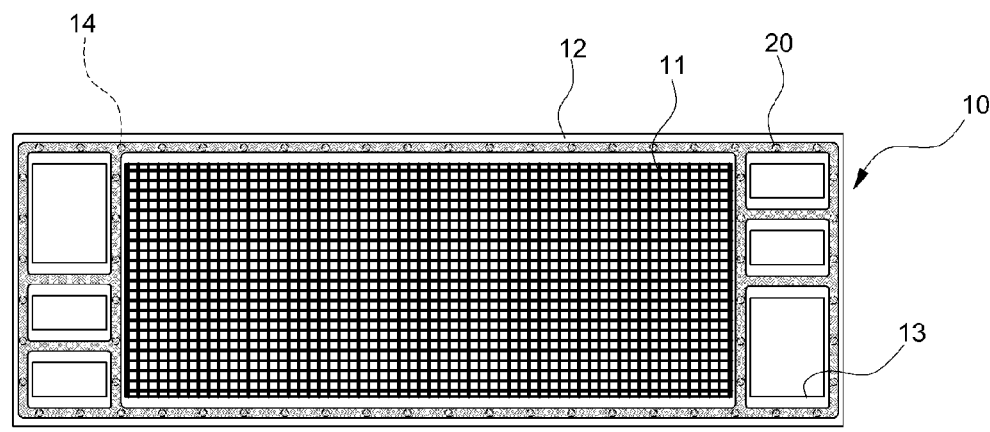

Alternatively, FIGS. 5 and 6 show plan views of metallic porous bodies providing improved integration with a gasket in accordance with the illustrative embodiment of the present invention. FIG. 5 shows a state of the metallic porous body before the gasket is bonded, while FIG. 6 shows a state of the metallic porous body after the gasket is bonded. In FIGS. 5 and 6, (a) shows an example in which the expanded metal is used as the metallic porous body, and (b) shows an example in which the metal mesh is used as the metallic porous body.

As shown in FIGS. 5 and 6, through apertures 14 are formed at positions, where the gasket 20 may be formed by, e.g., injection molding, of the flat portion 12 of the metallic porous body 10, and a resin for the gasket 20 may be, e.g., injection molded on the flat portion 12 such that the through apertures 14 are filled with the resin. Here, as the resin is inserted into the through apertures 14, the gasket 20 can be firmly fixed to the flat portion 12 of the metallic porous body 10.

In particular, since the gasket 20 may be, e.g., injection molded along the through apertures 14 of the flat portion 12 on both sides of the metallic porous body 10, the gaskets 20 on both sides of the metallic porous body 10 are integrally connected to each other through the through apertures 14 and thus firmly fixed to the flat portion 12 of the metallic porous body 10 as a single molded unit.

The plurality of through apertures 14 are formed at regular intervals at positions, where the gasket 20 is bonded to the flat portion 12, i.e., around the porous portion 11 and the manifold apertures 13. While circular through apertures 14 are shown in the embodiments of FIGS. 5 and 6, the through apertures may have various shapes such as a triangle, a rectangle, etc., and the number, size, and distance of the through apertures may vary according to the size of the metallic porous body. Therefore, the number, size, and distance of the through apertures are not particularly limited in the present invention.

Moreover, the shape and size of the gasket 20 may be suitably selected by considering the size of the metallic porous body 10, and any structure capable of maintaining the air tightness of the porous portion 11 and the manifold apertures 13 may be used in the present invention.

Figure 7:
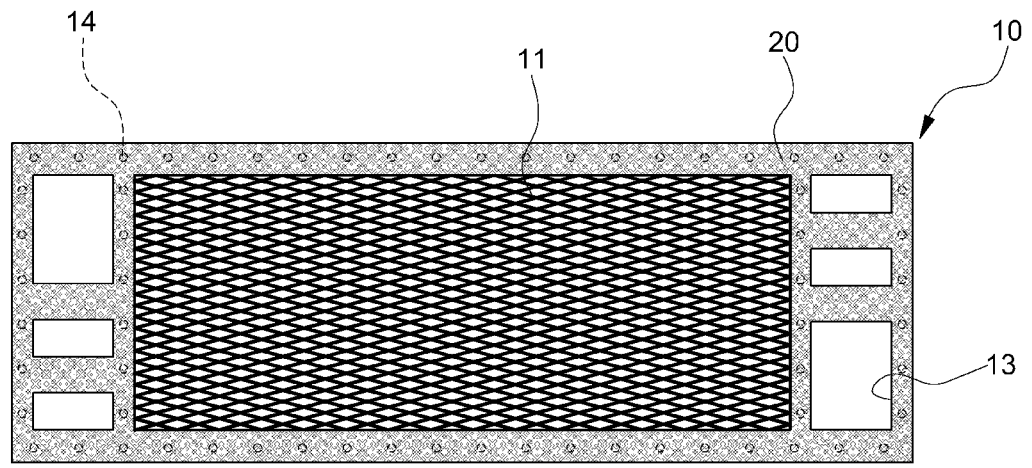
FIG. 7 shows plan views of gasket-integrated metallic porous bodies using through apertures in accordance with still another exemplary embodiment of the present invention.
Figure 7:
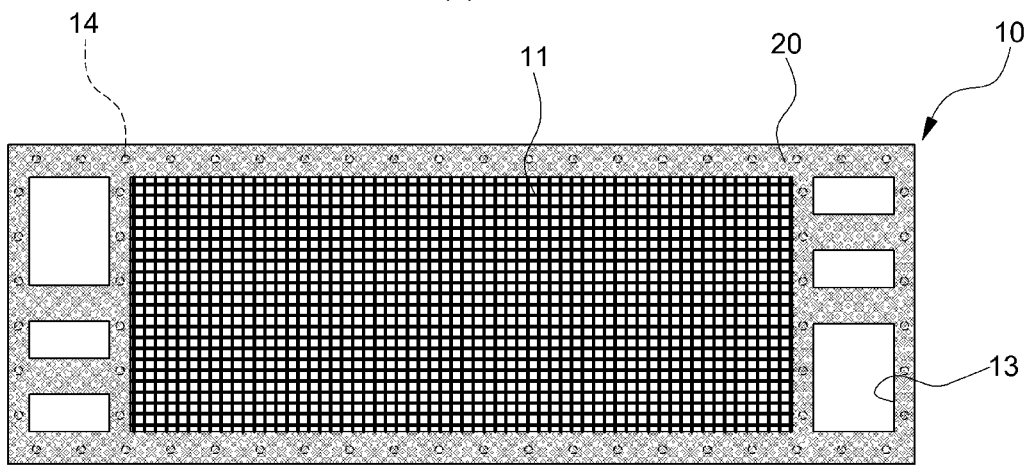

FIG. 7 shows plan views of gasket-integrated metallic porous bodies using through apertures in accordance with still another exemplary embodiment of the present invention, in which through apertures 14 are formed in the same manner as FIG. 6 and the gasket 20 is integrally formed to surround the flat portion (denoted by reference numeral 12 in FIG. 6) of each metallic porous body 10.

As shown in the figure, the gasket 20 may be, e.g., injection molded to surround the flat portion on both sides of the metallic porous body 10 in such a manner that a resin for the gasket 20 may be injection molded on the flat portion around the porous portion 11 and the manifold apertures 13 such that the flat portions around the porous portion 11 and the manifold apertures 13 are integrated by the gasket 20, thus forming a gasket-integrated metallic porous body.

FIGS. 8 to 11 are diagrams showing the states where a gasket-integrated metallic porous body 10, a separator 30, and a membrane electrode assembly 40 are stacked together in accordance with the present invention. The metallic porous body 10 of the present invention may be integrated with the gasket 20 (refer to FIGS. 8 and 10) or may be integrated with the gasket 20 and the separator 30 (refer to FIGS. 9 and 11) at the same time.

As such, the present invention may provide a metallic porous body 10, in which the separator 30 is further integrated. That is a gasket-separator-integrated metallic porous body (or gasket-separator-metallic porous body assembly), as well as the gasket-integrated metallic porous body 10, and these are repeatedly stacked with the membrane electrode assembly 40 to form the fuel cell stack.

Figure 8:
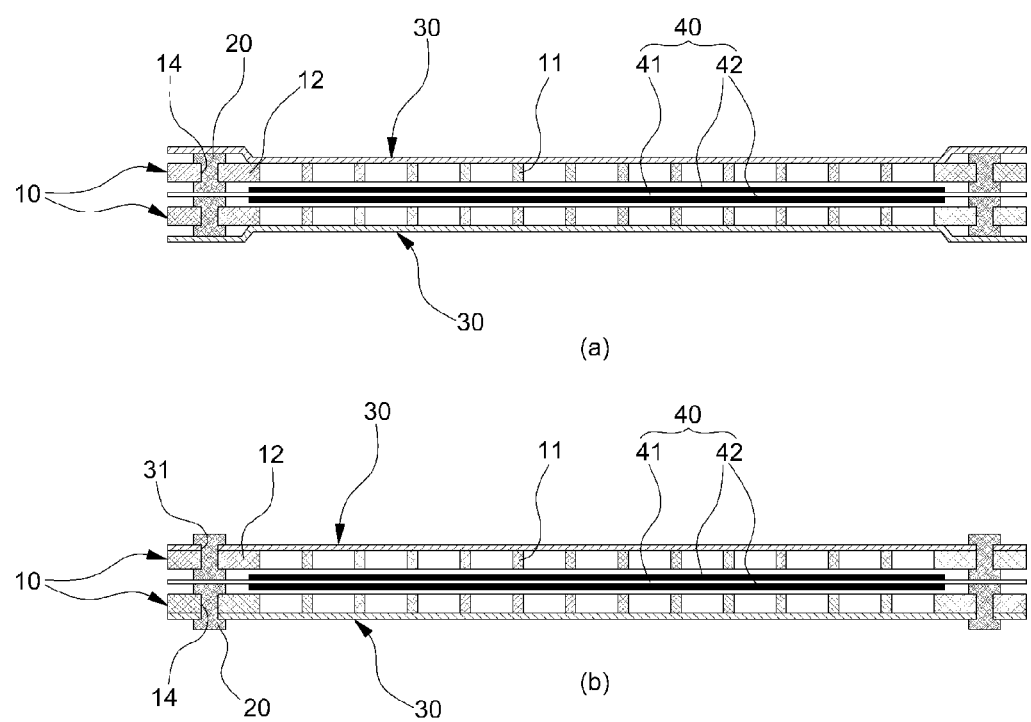
FIGS. 8 to 11 are diagrams showing the states where a gasket-integrated metallic porous body, a separator, and a membrane electrode assembly are stacked together in accordance with the exemplary embodiment of the present invention.
Figure 9:
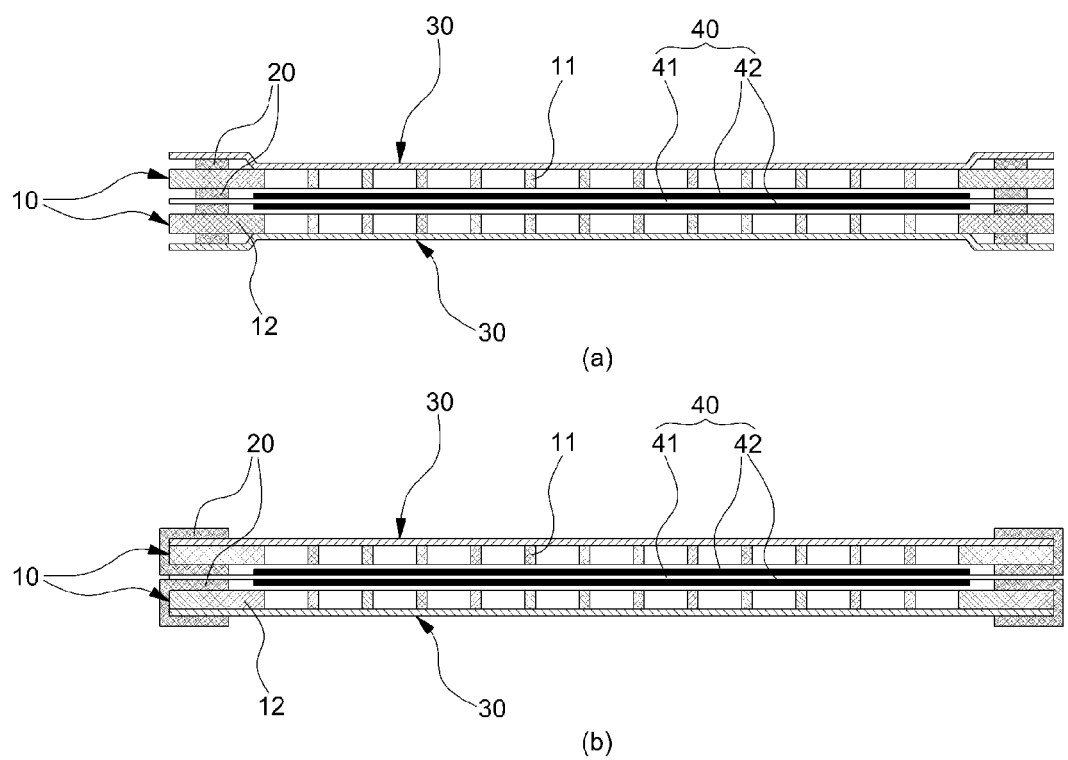
Figure 10:
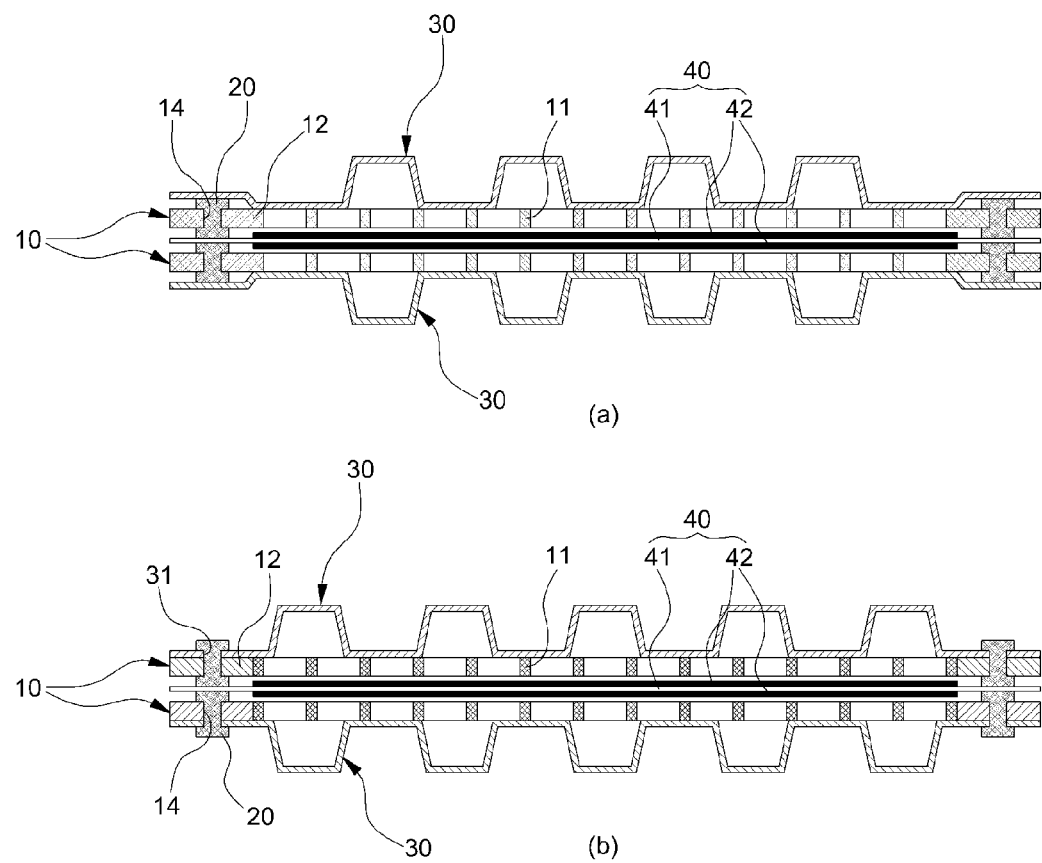
Figure 11:
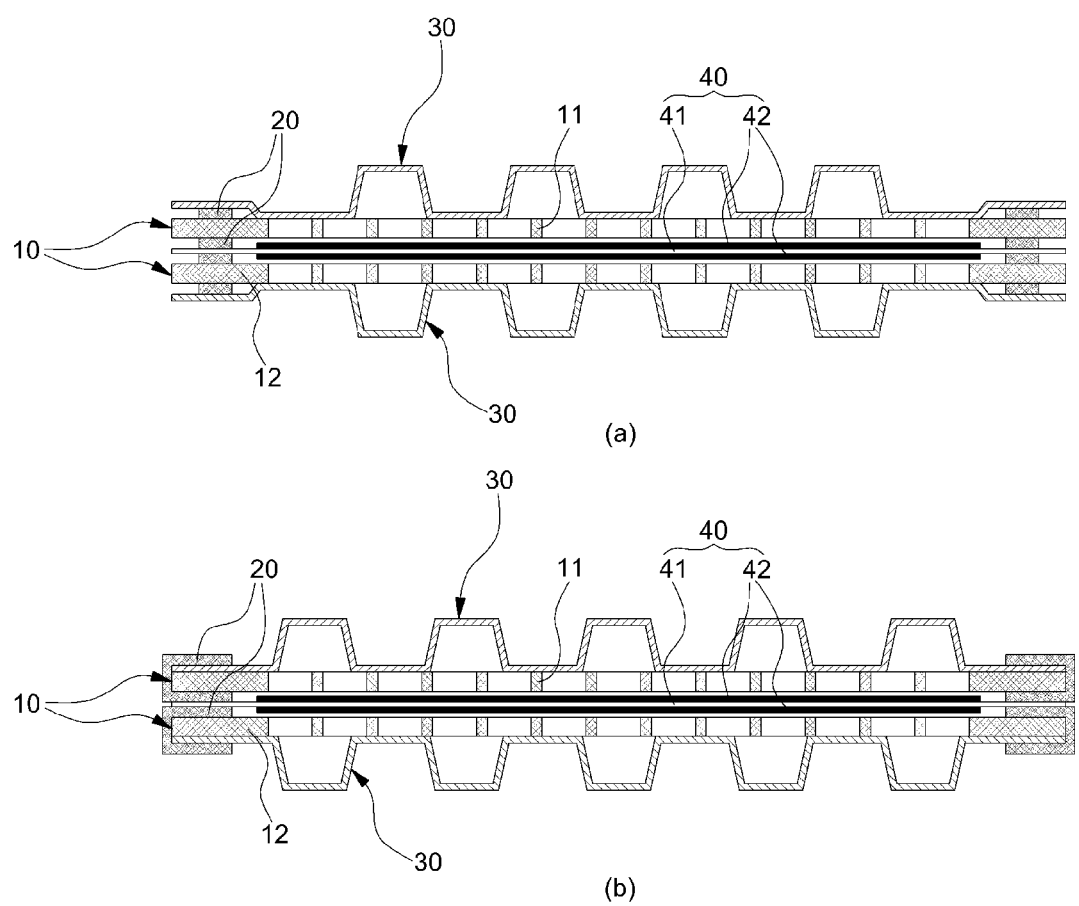

FIGS. 8 and 9 are cross-sectional views showing plate metal separators and FIGS. 10 and 11 are cross-sectional views showing flow field plate metal separators, taken along the same lines as A-A and B-B of FIG. 2.

In each figure, (a) shows an example of the metallic porous body 10 integrated with the gasket 20 (i.e., the gasket-integrated metallic porous body), and (b) shows an example of the metallic porous body 10 integrated with the gasket 20 and the separator 30 (i.e., the gasket-separator-integrated metallic porous body).

In detail, (a) of FIG. 8 shows an example of the gasket-integrated metallic porous body 10 prepared by forming the through apertures 14 in the flat portion 12 of the metallic porous body 10 as shown in FIG. 5 and e.g., injection molding the gasket 20 such that the gasket 20 and the metallic porous body 10 are firmly integrated together through the through aperture 14 as shown in FIG. 6.

Here, the metallic porous body 10 integrated with the gasket 20 may be the expanded metal porous body or the metal mesh porous body discussed above. While the gasket-integrated metallic porous body 10 shown in FIG. 6, in which the gasket 20 may be, e.g., injection molded along the through apertures 14, is used, the gasket-integrated metallic porous body 10 shown in FIG. 7, in which the gasket 20 may be, e.g., injection molded to surround the flat portion including the through apertures 14, may be used as well.

Additionally, a gasket-integrated porous body 10 may be stacked on both sides of the membrane electrode assembly 40, and the separator 30 may be stacked outside the gasket-integrated metallic porous body 10 as shown in (a) of FIG. 8.

That is, the separator 30, the gasket-integrated metallic porous body 10, the membrane electrode assembly 40, the gasket-integrated metallic porous body 10, and the separator 30 are repeatedly stacked in this order. Here, the gasket 20 integrally bonded to the metallic porous body 10 maintains the air-tightness between the separator 30 and a polymer electrolyte membrane 41 of the membrane electrode assembly 40.

Alternatively, (a) of FIG. 9 shows an example of the gasket-integrated metallic porous body prepared without forming a through aperture, i.e., the gasket-integrated metallic porous body of FIG. 3.

Here, as shown in FIG. 3, the gasket-integrated metallic porous body 10 is prepared by, e.g., injection molding the gasket 20 along the entire perimeter of the porous portion 11 and the manifold apertures (not shown in FIG. 9 and denoted by reference numeral 13 in FIG. 3). As an even further alternative, instead of the gasket-integrated metallic porous body 10 shown in FIG. 3, the gasket-integrated metallic porous body 10 prepared by, e.g., injection molding the gasket (denoted by reference numeral 20 in FIG. 7) to surround the flat portion 12 may also be used (i.e., a structure without the through apertures in the embodiment of FIG. 7).

Even in this case, during assembly of the fuel cell stack, the separator 30, the gasket-integrated metallic porous body 10, the membrane electrode assembly 40, the gasket-integrated metallic porous body 10, and the separator 30 are repeatedly stacked in the same manner as (a) of FIG. 8.

Conversely, (b) of FIG. 8 shows an example of the gasket-separator-integrated metallic porous body prepared by forming through apertures 31, which coincide with the through apertures 14 of the metallic porous body 10, along the outer edges of the separator 30 and e.g., injection molding the gasket 20 along the through apertures 31 of the separator and the metallic porous body 10, which are stacked together, such that the metallic porous body 10 and the separator 30 are integrally bonded to each other by the gasket 20.

As shown in the figure, when the metallic porous body 10 and the separator 30 are stacked together, the gasket 20 is, e.g., injection molded on the flat portion 12 of the metallic porous body 10 and the outer edges of the separator 30 including the through apertures 14 and 31 such that the gaskets 20, e.g., injection molded on both sides, are connected to each other through the through apertures 14 and 31. As a result, the separator 30 is further integrated with the metallic porous body 10 by the gaskets 20.

In this case, during assembly of the fuel cell stack, a gasket-separator-integrated metallic porous body is stacked on both sides of the membrane electrode assembly 40. After assembly of the fuel cell stack, the metallic porous body 10 is disposed on both sides of the membrane electrode assembly 40, and the separator 30 is disposed outside the metallic porous body 10.

That is, the separator 30, the metallic porous body 10, the membrane electrode assembly 40, the metallic porous body 10, and the separator 30 are repeatedly stacked in this order.

While the gasket-separator-integrated metallic porous body, in which the gasket 20 may be, e.g., injection molded, along the through apertures 14 and 31, is shown in (b) of FIG. 8, the gasket-separator-integrated metallic porous body of FIG. 7, prepared by, e.g., injection molding the gasket to surround the flat portion of the metallic porous body and the outer edges of the separator including the through apertures, may be used (i.e., a structure in which the through apertures are added in the embodiment of FIG. 9B).

Next, (b) of FIG. 9 shows an example of the gasket-separator-integrated metallic porous body, which is integrated without forming a through aperture.

The gasket-separator-integrated metallic porous body is prepared by, e.g., injection molding the gasket 20 to surround the flat portion 12 of the metallic porous body 10 and the outer edges of the separator 30 such that the separator 30 and the metallic porous body 10 are integrated together by the gasket 20.

In this case, during assembly of the fuel cell stack, the gasket-separator-integrated metallic porous body is stacked on both sides of the membrane electrode assembly 40 in the same manner as in (a) of FIG. 9. After assembly of the fuel cell stack, the metallic porous body 10 is disposed on both sides of the membrane electrode assembly 40, and the separator 30 is disposed outside the metallic porous body 10.

That is, the separator 30, the metallic porous body 10, the membrane electrode assembly 40, the metallic porous body 10, and the separator 30 are repeatedly stacked in this order.

When the separators are integrated with the metallic porous bodies shown in (b) FIGS. 8 and 9, the gasket may be, e.g., integrally injection molded around the manifold apertures of each separator accordingly.

Additionally, in the examples illustrated in FIGS. 10 and 11, there are no differences in the integrally bonded structure and the tacked structure from those of the examples of FIGS. 8 and 9, except that flow field plate metal separators are used instead of plate metal separators.

That is, in (a) of FIGS. 10 and 11, there are no differences in the integrally bonded structure of the gasket 20 and the metallic porous body 10 and the stacked structure of the gasket-integrated metallic porous body, the membrane electrode assembly 40, and the separator from those of (a) FIGS. 8 and 9. Moreover, in (b) of FIGS. 10 and 11, there are no differences in the integrally bonded structure of the gasket 20, the separator 30, and the metallic porous body 10 and the stacked structure of the gasket-separator-integrated metallic porous body and the membrane electrode assembly 40 from those of (b) FIGS. 8 and 9.

In particular, FIG. 10 shows a structure integrated with the through apertures 14 and 31 and FIG. 11 shows a structure integrated without forming a through aperture.

Advantageously, the metallic porous body provided by the present invention for fuel cells utilizes a flat portion having a flat surface structure formed along outer edges of a metallic porous body, which thereby improves the handling and working properties. Moreover, the metallic porous body described above eliminates the sharp outer edges, and thus, when it is used as a gas diffusion layer, it prevents the pin apertures of the membrane electrode assembly from being damaged, thereby preventing deterioration of overall fuel cell performance.

Furthermore, the metallic porous body according to the present invention can be accurately and precisely stacked and can be processed by an automatic assembly method, thereby improving the productivity of the fuel cell stack.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A metallic porous body for a fuel cell formed by stacking a plurality of unit cells, the metallic porous body comprising:
a porous portion which is in contact with a reactive area of a membrane electrode assembly and corresponds to a reactive area of each unit cell;
a flat portion having a flat surface structure formed along outer edges of the metallic porous body other than the porous portion corresponding to the reactive area, wherein the metallic porous body is a gas diffusion layer; and
wherein the flat portion includes through apertures of the flat portion formed at positions where a gasket is molded such that the metallic porous body acting as the gas diffusion layer is firmly integrated with a separator of the fuel cell by the gasket molded on one side of the separator and one side of the flat portion by a resin to act as the gasket inserted into the through apertures.

2. The metallic porous body of claim 1, wherein the flat portion is integrated with the gasket such that the gasket is integrally bonded to the metallic porous body.

3. The metallic porous body of claim 1, wherein the flat portion located on both sides of the metallic porous body comprises manifold apertures, through which hydrogen, air, and coolant pass, having the same size as manifold apertures of a separator and formed at positions corresponding to the manifold apertures of the separator, the manifold apertures of the flat portion forming hydrogen, air, and coolant inlet and outlet manifolds together with the manifold apertures of the separator after assembly of the fuel cell.

4. The metallic porous body of claim 3, wherein the manifold apertures of the flat portion are integrated with the gasket that is formed by injection molding such that the metallic porous body is integrally bonded to the gasket around the manifold apertures of the flat portion.

5. The metallic porous body of claim 2, wherein the gasket is molded and bonded to both sides of the flat portion of the metallic porous body or molded to surround the outer edges and both sides of the flat portion.

6. The metallic porous body of claim 2, wherein the gasket is molded to surround the flat portion and the outer edges of the separator, in a state where the metallic porous body and the separator are stacked together, such that the separator is further integrated with the metallic porous body by the gasket.

7. The metallic porous body of claim 6, wherein the gasket is molded and bonded to the manifold apertures of the separator in a state where the metallic porous body and the separator are integrated together.

8. The metallic porous body of claim 2, wherein the flat portion comprises through apertures formed at locations where the gasket is molded, the separator comprises through apertures formed at locations corresponding to the through apertures of the flat portion, and the gasket is molded to surround the outer edges including the through apertures of the flat portion and the separator, in a state where the metallic porous body and the separator are stacked together, such that the metallic porous body is firmly integrated with the gasket and the separator by the through apertures.

9. The metallic porous body of claim 1, wherein the porous portion corresponding to the reactive area is an expanded metal, and wherein the porous portion comprises apertures, and a metal plate, disposed at the outer edges of the porous portion, has no apertures and constitutes the flat portion integrated with the porous portion.

10. The metallic porous body of claim 1, wherein the porous portion corresponding to the reactive area is a metal mesh and the outer edges of the metal mesh are coated with a thin metal film such that the metal film is the flat portion and the metal mesh is the porous portion.

11. The metallic porous body of claim 1, wherein the porous portion corresponding to the reactive area is a metal mesh, and the outer edges of the metal mesh are inserted into internal grooves of an opening of a metal member with a rectangular frame shape such that the metal member is the flat portion and the metal mesh is the porous portion.

* * * * *